(12) United States Patent
Arns

(10) Patent No.: US 7,230,761 B2
(45) Date of Patent: Jun. 12, 2007

(54) HIGH-DISPERSION GRISMS

(75) Inventor: James A. Arns, Saline, MI (US)

(73) Assignee: Kaiser Optical Systems, Inc., Ann Arbor, MI (US)

( * ) Notice: Subject to any disclaimer, the term of this patent is extended or adjusted under 35 U.S.C. 154(b) by 152 days.

(21) Appl. No.: 11/118,978

(22) Filed: Apr. 29, 2005

(65) Prior Publication Data

US 2005/0243421 A1  Nov. 3, 2005

Related U.S. Application Data

(60) Provisional application No. 60/566,489, filed on Apr. 29, 2004.

(51) Int. Cl.
*G02B 37/44* (2006.01)
*G02B 5/18* (2006.01)

(52) U.S. Cl. .................. 359/566; 359/15; 359/831; 359/834; 359/837; 385/37

(58) Field of Classification Search .................. 359/15, 359/566, 831, 834, 837; 385/37; 356/305
See application file for complete search history.

(56) References Cited

U.S. PATENT DOCUMENTS

| | | | | |
|---|---|---|---|---|
| 5,530,565 | A | 6/1996 | Owen | 359/15 |
| 6,278,534 | B1* | 8/2001 | Arns | 359/15 |
| 6,449,066 | B1* | 9/2002 | Arns et al. | 359/15 |
| 2004/0223201 | A1* | 11/2004 | Dickson | 359/15 |

OTHER PUBLICATIONS

Y. Huang, D. Su, and Y Tsai; Wavelength-division-multiplexing and -demultiplexing by using a substrate-mode grating pair, Optics Letters, vol. 17, No. 22, Nov. 15, 1992.
R. Kostuk, et. al.; "Reducing alignment and chromatic sensitivity of holographic optical interconnects with substrate-mode holograms," Applied Optics, vol. 28, No. 22, Nov. 15, 1989.
E. B. Treacy, "Optical Pulse Compression With Diffraction Gratings," IEEE Journal of Quantum Electronics, vol. QE-5, No. 9, Sep. 1969.
D. E. Sheat,, G. R. Chamberlin, and D. J. McCartney; "Double Dispersion from Dichromated Gelatin Volume Transmissioin Gratings," Proceedings of the SPIE, vol. 1461, 1991.

* cited by examiner

*Primary Examiner*—Leonidas Boutsikaris
(74) *Attorney, Agent, or Firm*—Gifford, Krass, Sprinkle, Anderson & Citkowski, PC

(57) ABSTRACT

A grism based upon a grating with a given line frequency is configured such that a design wavelength will undergo either a specific total bend angle, a zero-degree total bend without lateral displacement, or a zero-degree total bend with a lateral displacement. Each configuration exhibits the same dispersion characteristics. Other design wavelengths, bend angles and displacements are possible through appropriate adjustment of grating frequency, prism geometry, and/or material(s). A specific design is disclosed using light with a +/−delta wavelength around a design wavelength of 795 nm. The invention may be used to disperse light at different wavelengths, including wavelengths associated with optical communications bands.

20 Claims, 1 Drawing Sheet

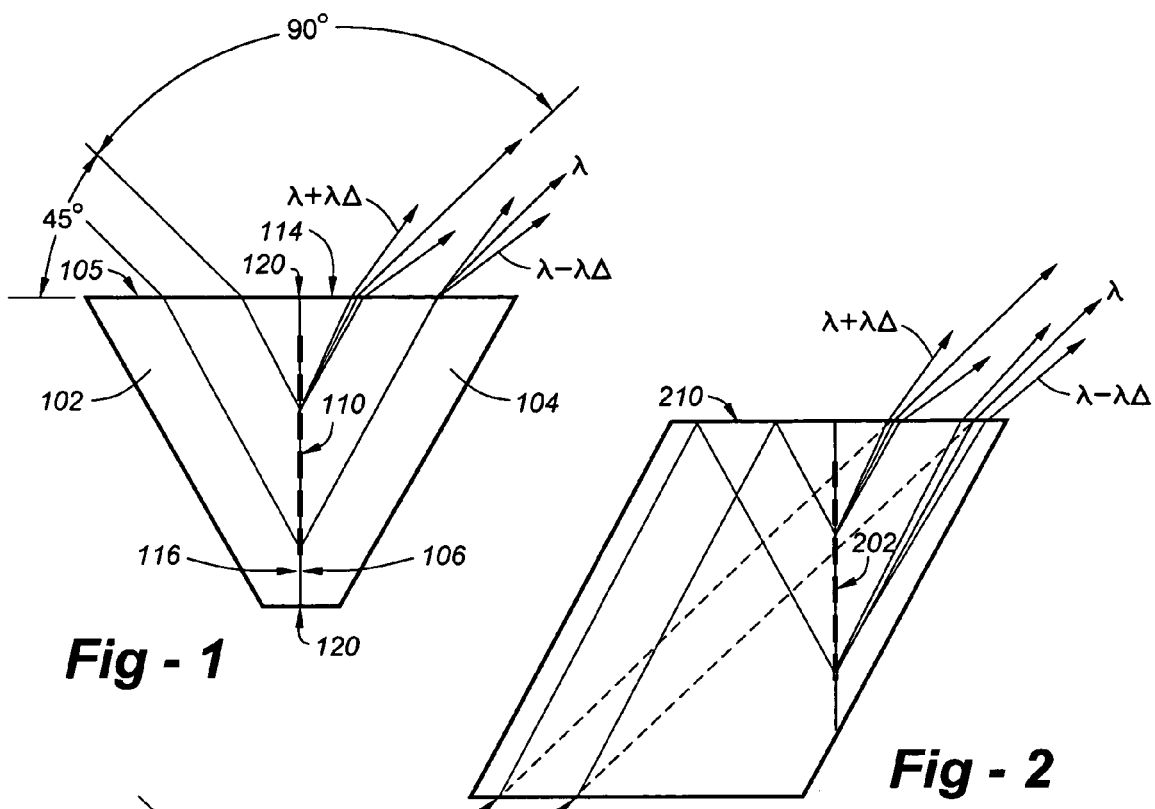
Fig - 1
Fig - 2
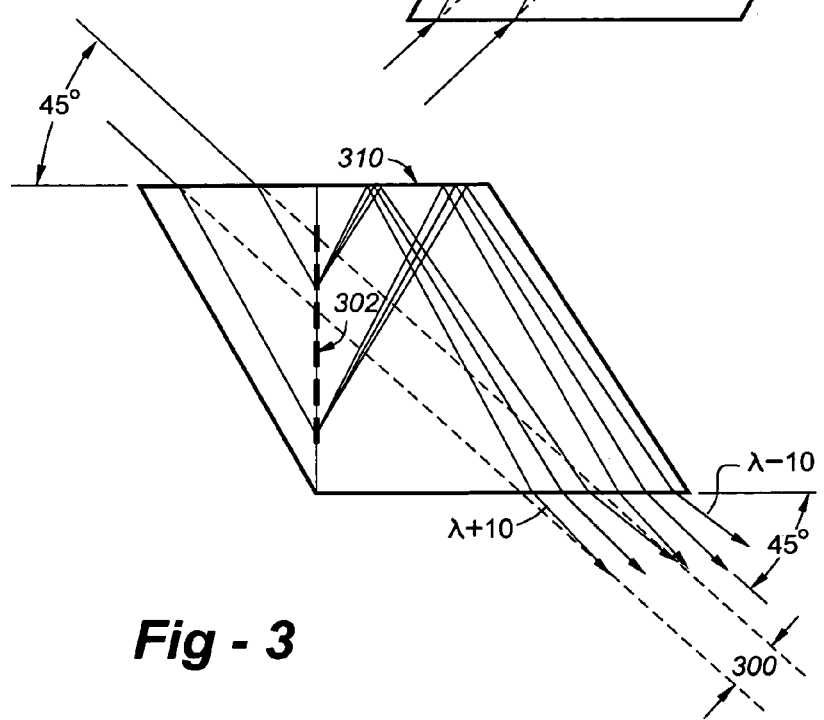
Fig - 3

HIGH-DISPERSION GRISMS

REFERENCE TO RELATED APPLICATION

This application claims priority from U.S. Provisional Patent Application Ser. No. 60/566,489, filed Apr. 29, 2004, the entire content of which is incorporated herein by reference.

FIELD OF THE INVENTION

This invention relates generally to prism gratings (grisms), and in particular, to compact, high-dispersion grisms configured such that a design wavelength will undergo either a specific total bend angle, a zero-degree total bend without lateral displacement, or a zero-degree total bend with a lateral displacement.

BACKGROUND OF THE INVENTION

Optical dispersion, that is, the separation of light into its constituent wavelength components, is a phenomenon used by a wide variety of applications, including Raman and fluorescence detection and other forms of spectral analysis. In addition, the emerging field of optical communications uses optical dispersion to perform wavelength multiplexing and demultiplexing, filtering and other functions. Although the concept of optical dispersion has been known for quite some time, the earliest apparatus utilized prisms as a diffraction means. Optical gratings were later developed for this purpose, and, since the invention of holography, holographic gratings have been applied to this task with enhanced efficacy.

It is known to pass polychromatic light through a pair of identical gratings that act together to provide an output beam which is both collimated and laterally dispersed. Such an arrangement is disclosed by E. B. Treacy in "Optical Pulse Compression With Diffraction Gratings," IEEE Journal of Quantum Electronics, Vol. QE-5, No. 9, September, 1969, which finds particular application in pulse compression for ultrafast laser systems that employ chirped-pulse amplification. The first grating diffracts each wavelength through a different angle according to the grating equation, thereby introducing angular dispersion to the polychromatic beam, so that the beam spreads as it propagates from the first grating toward the second. The second grating diffracts each wavelength again through the same angle, but in the opposite direction, so that the beam leaves the second grating in the same direction as the beam that was incident to the first grating, with the various wavelengths being spread laterally but propagating in exactly the same direction, or recollimated. One disadvantage of this configuration is that the gratings and auxiliary optics are separate elements that must be individually mounted and aligned, with the attendant risk of alignment drift with time or mechanical motions such as vibration.

It is also known that dispersion may be increased by passing light through a plurality of gratings, each grating further dispersing the light incident to it. In "Double dispersion from dichromated gelatin volume transmission gratings," Proceedings of the SPIE, Vol. 1461, 1991, D. E. Sheat, G. R. Chamberlin, and D. J. McCartney disclosed a configuration wherein light is passed through a single grating two times with the aid of a mirror, either separate from the grating or made part of the grating to form an integrated device. However, this configuration is limited to two passes of the light through the grating, and the beam that exits from the integrated device is counter-propagating with respect to the incident beam, so that separating the input and output beams requires additional optical components or performance compromises. Moreover, the configuration described by Sheat, et al. only produces angularly dispersed light, so that conversion to a laterally dispersed, collimated beam again requires additional optical components.

There are also described in the literature dispersive optical elements specifically intended for optical communications. Such a structure is described by Y. Huang, D. Su, and Y Tsai in "Wavelength-division-multiplexing and—demultiplexing by using a substrate-mode grating pair," Optics Letters, Vol. 17, No. 22, Nov. 15, 1992. According to this device, within a substrate-mode element there are two distinct gratings which first angularly disperse and then recollimate incident light. The output channel separation or the spatial dispersion of such a structure is directly related to the angular dispersion obtained through the first grating and the distance the dispersed light travels before being collimated by the second grating. The amount of dispersion in the substrate-mode element is therefore dependent on the length as well as the thickness of the substrate. In a practical sense, the substrate must therefore be long to provide substantial optical distance between the dispersing grating and the collimating grating to obtain high degree of spatial dispersion. Additionally, the space between the dispersing and collimating grating cannot include a grating, or the total internal reflection necessary for propagation would be prevented.

Another prior-art device is described by R. Kostuk, et. al. in "Reducing alignment and chromatic sensitivity of holographic optical interconnects with substrate-mode holograms," Applied Optics, Vol. 28, No. 22, Nov. 15, 1989. The structure of the substrate-mode element described in this paper incorporates a holographic grating as an input element to produce a+1 and a+1 diffracted order from the incident light. These orders propagate through the substrate by means of multiple internal reflections until intercepted by holographic optical elements which redirect, focus, and couple each beam out of the structure and onto receivers. The purpose of this structure is to produce multiple beams output into some preferred spatial arrangement from a single incident beam of coherent light.

The term "grism" refers to a grating-prism combination. More technically, a grism (or Carpenter's prism) is formed by replicating a transmission grating onto the hypotenuse face of a right-angle prism. The spectrum produced by the grating is deflected by the prism to remain on the optical axis and the apex angle of the prism is chosen to get a certain wavelength in the center of the detector. Grisms are useful in spectrometers that require in-line presentation of the spectrum. The light diffracted by the grating is bent back in line by the refracting effect of the prism. A typical use for grisms is to unfold the light path in that the entrance prism and the exit prism apex angles compensate for the input and exit angles of light to and away from the grating resulting in a non-displaced central wavelength. Another typical use is to provide an entrance and exit window for light to enter and exit the grating which otherwise would exceed the critical angle.

U.S. Pat. No. 5,530,565 describes a narrow bandwidth bandpass filter having high transmission efficiency for the passband and excellent out-of-band attenuation employs a transmission holographic grating sandwiched between the oblique faces of a pair of right angle glass prisms. An incoming laser beam to be filtered is incident normal to one of the prism faces so as to intersect the holographic grating at about 45 degrees. The grating frequency is such as to diffract light of the transmission wavelength through substantially 90 degrees so that it exits the cube formed by the two prisms from the right angle face of the second prism. The out-of-band wavelengths of the incident beam are either transmitted unaffected through the grating or diffracted at a different angle than the light of the transmission wavelength. A spatial filter comprising a mask with a central aperture is supported a spaced distance from the output face of the cube so that diffracted light of the transmission wavelength passes through the aperture and the unwanted wavelengths, which are diffracted at different angles than the transmission wavelength, are blocked by the mask.

U.S. Pat. No. 6,278,534 is directed to a compact, preferably monolithic optical element converts an incident beam of light into a dispersed exit beam. A transmissive optical grating is supported between two reflective surfaces such that a beam is reflected to pass through the same grating at least twice to form the exit beam. In the preferred embodiment, the grating is a volume hologram cemented between two optically transmissive substrates which include outwardly oriented surfaces that are parallel to one another and to the grating, and the internal reflections occur at these surfaces. Mirrors may also be used. A preferred method of grating formation is also disclosed.

In U.S. Pat. No. 6,449,066, a volume-phase optical grating, preferably supported between substrates and prisms, uses large-angle input and output light beams to provide a very high degree of dispersion and improved separation of closely spaced wavelength channels. The average refractive index of the grating medium is also less than that of the supporting substrates and prisms, thereby providing improved uniformity and reduced sensitivity to the state of light polarization. The device therefore finds utility as a wavelength multiplexer, demultiplexer or optical spectrum analyzer in fields such as optical communications and optical signal processing. The grating itself may be constructed by conventional interferometric or holographic techniques, and may be a reflection or transmission device. In a system configuration, optical fibers may be used to carry the multiplexed or demultiplexed optical signals. Optoelectric detectors may also be used to detect different wavelengths and convert the optical signals into electrical counterparts. Alternatively, electrical signals may be converted to optical signals of differing wavelength, and these may be multiplexed using one or more of the inventive devices.

Despite these advances, there continues to exist an outstanding need for an optically dispersive structure which may take advantage of the same grating to achieve a multiplicative dispersive effect, ideally, to achieve a high degree of direct lateral dispersion from a monolithic component.

SUMMARY OF THE INVENTION

The invention resides in the combination of a dispersion grating with entrance and exit prisms that results in high dispersion. The grating and prism assembly, or grism, is configured such that the design wavelength will undergo either a specific total bend angle, a zero-degree total bend without lateral displacement, or a zero-degree total bend with a lateral displacement.

Each design wavelength has an associated diffraction grating line frequency that satisfies the input and output angle requirements. The design of these configurations is such that the same line frequency grating may be used for a given wavelength in each assembly. Each grism configuration exhibits the same dispersion characteristics.

A specific design is disclosed using light with a +/−delta wavelength around a design wavelength of 795 nm and a total bend angle of 90 degrees. Other design wavelengths, bend angles and displacements are possible through appropriate adjustment of grating frequency, prism geometry, and/or material(s).

BRIEF DESCRIPTION OF THE DRAWINGS

FIG. 1 shows one preferred embodiment according to the invention;

FIG. 2 is a drawing of a design that results in a straight through, zero degree bend angle without lateral displacement of the design wavelength; and FIG. 3 is a drawing of a design that results in a straight through, zero degree bend angle with lateral displacement of the design wavelength.

DETAILED DESCRIPTION OF INVENTION

The invention uses entrance and exit prisms attached to a diffraction grating configured in such a way with the result of high angular dispersion. Additional dispersion is obtained by selecting the orientation of the entrance and/or exit prism face(s) to enhance the angular dispersion resulting from the diffraction grating alone.

FIG. 1 shows one preferred embodiment according to the invention. The prisms 102, 104 in this embodiment are fabricated from BK7 glass, a common optical quality material. The entrance prism 102 has two faces 105, 106 located 90 degrees from each other. Associated with face 106 is a volume-phase holographic transmission diffraction grating 110.

The second prism, exit prism 104, also has two faces 114, 116 located at 90 degrees to each other. The device is assembled such that face 116 is coextensive with face 106 of the diffraction grating subassembly, such that the two faces of each prism align to a common plane 120. The diffraction grating 110 is oriented between the two prisms such that the grating lines or fringes diffract the design wavelength of light in a plane perpendicular to the common plane formed by the entry and exit prism faces.

A specific design incorporating this embodiment uses light with a +/−delta wavelength around a design wavelength of 795 nm. Light of this spectral range impinges on the entrance face of 102 prism at 45 degrees from the normal. The entry face and exit faces of the grism may be treated with an anti-reflection coating to improve the transmission of the light into the prism.

After entering the prism, the light impinges on the diffraction grating at an angle of approximately 62 degrees. The diffraction grating has a line frequency that produces diffraction of the design wavelength of 795 nm, also at 62 degrees. For the design wavelength of 795 nm, the line frequency of the grating is 3358.98 lines per millimeter. Dispersion from the diffraction grating inside the prism in the spectral neighborhood of the design wavelength is 0.41 degrees per nanometer.

After passing through the diffraction grating, the dispersing light impinges on the exit prism face and exits the grism. The design wavelength exits at 45 degrees from the exit face normal resulting in a total bend angle of 90 degrees. Delta wavelengths from the design wavelength exit the output prism face at angles other than that of the design wavelength. Additional dispersion is obtained due to the angle of the exit face with respect to the direction of the light. Total dispersion of the light in the spectral neighborhood of the design wavelength hat exits the grism is 0.52 degrees per nanometer.

Alternative embodiments of the invention are presented by way of figures that show the versatility of the invention. The first variation, depicted in FIG. 2, shows a configuration that results in a straight through, zero-degree bend angle without lateral displacement of the design wavelength. The grating is shown at 202. A reflective coating is preferably applied to surface 210 of the entrance element that folds the entry path of light onto the diffraction grating.

A different variation, shown in FIG. 3, demonstrates a design that results in a straight through, zero degree bend angle with lateral displacement 300 of the design wavelength. Lateral displacement can be a useful design tool. In this example, a reflective coating is applied to surface 310 of the exit element to fold the exit light path away from the diffraction grating and onto the exit face. The grating is shown at 302.

The different embodiments find application in many different fields of use, including optical probes, communications, and analysis. For example, the embodiment providing a specific total bend angle may be used as a higher replacement for the grism disclosed in commonly assigned U.S. Pat. No. 5,530,565, the entire content of which is incorporated herein by reference. Not only does the device described here provide enhanced dispersion and more polarization insensitivity, but with a 90-degree fold angle a drop-in replacement is possible. Those of skill in the art of optics will also appreciate that the invention may be used to disperse light at different wavelengths, including optical communications bands such as the C-band (1525–1565 nm), L-band (1575–1608 nm), or extended L-band (1555–1608 nm) through appropriate adjustment of grating frequency, prism geometry, and/or material(s). For example, the invention may be used to disperse light in the C-band region by adjusting the grating frequency to 1707.89 lines per millimeter. The resultant dispersion of the grating assembly would then be 0.26 degrees per nanometer.

I claim:

1. A high-dispersion grism receiving an input beam of light including a design wavelength along an optical axis, comprising:
    a dispersion optical grating having a line frequency disposed between an entrance prism and an exit prism; and
    wherein the grating and one or both prisms cooperate to transform the input beam into diffracted light with the design wavelength undergoing a zero degree total bend angle relative to the optical axis with or without lateral displacement due to internal reflection within at least one of the prisms.

2. The grism of claim 1, wherein the grating is a volume-phase holographic transmission grating.

3. The grism of claim 1, wherein the design frequency is associated with a telecommunications band.

4. The grism of claim 1, wherein the input beam undergoes an internal reflection in an entrance prism to facilitate a zero degree total bend without lateral displacement.

5. The grism of claim 1, wherein the diffracted light undergoes an internal reflection in an exit prism to facilitate a zero degree total bend with lateral displacement.

6. The grism of claim 1, wherein the internal reflection is at least assisted with the use of a reflective material attached to the relevant prism surface.

7. The grism of claim 1, wherein the internal reflection is a total internal reflection relative to the relevant prism surface.

8. The grism of claim 1, including a plurality of internal reflections.

9. A high-dispersion grism receiving an input beam of light including a design wavelength along an optical axis, comprising:
    an entrance prism having an entrance face and an exit face;
    an exit prism having an entrance face and an exit face;
    the prisms being joined to form an interface at the exit face of the entrance prism and the entrance face of the exit prism;
    a diffraction grating with a line frequency disposed at the interface; and
    wherein the diffraction grating, in conjunction with entrance and exit prism geometries, diffracts light at the design wavelength entering the entrance face of the entrance prism and exiting through the exit face of the exit prism at a zero degree total bend angle with or without lateral displacement due to internal reflection within at least one of the prisms.

10. The grism of claim 9, wherein the grating is a volume-phase holographic transmission grating.

11. The grism of claim 9, wherein the design frequency is associated with a telecommunications band.

12. The grism of claim 9, wherein the angle between the entrance face of the entrance prism and the interface is 90 degrees.

13. The grism of claim 9, wherein the angle between the exit face of the exit prism and the interface is 90 degrees.

14. The grism of claim 9, wherein light at the design wavelength enters the entrance face of the entrance prism at an angle of 45 degrees.

15. The grism of claim 9, wherein light at the design wavelength exits the exit face of the exit prism at an angle of 45 degrees.

16. The grism of claim 9, wherein the input beam undergoes an internal reflection in the entrance prism to facilitate a zero degree total bend without lateral displacement.

17. The grism of claim 9, wherein the diffracted light undergoes an internal reflection in the exit prism to facilitate a zero degree total bend with lateral displacement.

18. The grism of claim 9, wherein the internal reflection is at least assisted with the use of a reflective material attached to the relevant prism surface.

19. The grism of claim 9, wherein the internal reflection is a total internal reflection relative to the relevant prism surface.

20. The grism of claim 9, including a plurality of internal reflections.

* * * * *